(12) United States Patent
Jarvenpaa

(10) Patent No.: US 11,506,897 B2
(45) Date of Patent: Nov. 22, 2022

(54) DISPLAY APPARATUS AND METHOD

(71) Applicant: Nokia Technologies Oy, Espoo (FI)

(72) Inventor: Toni Jarvenpaa, Akaa (FI)

(73) Assignee: Nokia Technologies Oy, Espoo (FI)

( * ) Notice: Subject to any disclaimer, the term of this patent is extended or adjusted under 35 U.S.C. 154(b) by 371 days.

(21) Appl. No.: 16/954,257

(22) PCT Filed: Dec. 21, 2017

(86) PCT No.: PCT/FI2017/050921
§ 371 (c)(1),
(2) Date: Jun. 16, 2020

(87) PCT Pub. No.: WO2019/122496
PCT Pub. Date: Jun. 27, 2019

(65) Prior Publication Data
US 2021/0165222 A1 Jun. 3, 2021

(51) Int. Cl.
*G09G 5/00* (2006.01)
*G02B 27/01* (2006.01)
*H04N 13/327* (2018.01)
*H04N 13/344* (2018.01)

(52) U.S. Cl.
CPC ..... *G02B 27/0172* (2013.01); *G02B 27/0176* (2013.01); *H04N 13/327* (2018.05); *H04N 13/344* (2018.05); *G02B 2027/014* (2013.01); *G02B 2027/0132* (2013.01); *G02B 2027/0134* (2013.01); *G02B 2027/0138* (2013.01); *G02B 2027/0163* (2013.01); *G02B 2027/0198* (2013.01)

(58) Field of Classification Search
CPC ............ G02B 27/0172; G02B 27/0176; H04N 13/327; H04N 13/344
USPC .......................................................... 345/8
See application file for complete search history.

(56) References Cited

U.S. PATENT DOCUMENTS

| | | | |
|---|---|---|---|
| 2013/0038510 A1 | 2/2013 | Brin et al. | 345/8 |
| 2015/0042679 A1 | 2/2015 | Jarvenpaa | 345/633 |
| 2015/0061998 A1* | 3/2015 | Yang | G06F 3/04815 |
| | | | 345/156 |
| 2018/0288403 A1* | 10/2018 | Cole | H04N 13/344 |
| 2019/0129181 A1* | 5/2019 | Polcak | G02B 27/0955 |

* cited by examiner

*Primary Examiner* — Jonathan M Blancha
(74) *Attorney, Agent, or Firm* — Harrington & Smith

(57) ABSTRACT

An apparatus including a first display for a user's first eye; a first motion sensor and/or a first externally facing image capture device configured to capture at least a first image of a user's real world point of view; a second display for a user's second eye; a second motion sensor and/or a second externally facing image capture device configured to capture at least a second image of a user's real world scene; and a controller configured to: receive a first signal from: the first motion sensor and/or the first image capture device, receive a second signal from: the second motion sensor and/or the second image capture device, determine, based on the first and second signals, a change in orientation of the first display with respect to the second display, and control display of first content on the first display in dependence on the determined change in orientation.

20 Claims, 11 Drawing Sheets

DISPLAY APPARATUS AND METHOD

CROSS REFERENCE TO RELATED APPLICATION

This patent application is a U.S. National Stage application of International Patent Application Number PCT/FI2017/050921 filed Dec. 21, 2017, which is hereby incorporated by reference in its entirety.

TECHNOLOGICAL FIELD

Examples of the present disclosure relate to an apparatus, method and computer program for displaying content. Some examples, though without prejudice to the foregoing, relate to a binocular near eye display and a method for aligning and displaying mediated reality content.

BACKGROUND

In a binocular Near-Eye Display (NED), where a display is provided for each of a user's left and right eyes, the two displays (and images for the left and right eyes displayed thereon) need to be accurately aligned, preferably under a few arc minutes, so as to achieve an adequate overlap of the displayed left and right images when perceived by a user of the NED. For example, where the left and right images relate to stereoscopic content, accurate alignment enables the perceived displayed left and right images to be fused together by the user's visual system so that a 3D image may be perceived having depth perception.

Typically, in a conventional NED, once an initial alignment process has been performed (e.g. upon manufacture and/or initial factory calibration/alignment), maintenance of the alignment is ensured via robust construction of the NED, i.e. providing a structural support/frame that rigidly mounts the left and right displays and the associated optical/lens arrangements with respect to one another thereby maintaining their relative alignment such that only a single initial calibration/alignment may be required. However, a NED having such robust, rigid and stiff construction may provide sub-optimal user comfort when worn and used.

Conventional NED's are not always optimal. It is useful to provide a NED that provides greater user comfort when worn and used.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

According to one or more examples of the disclosure there is provided an apparatus comprising:
 a first display for a user's first eye;
 a first motion sensor and/or a first externally facing image capture device configured to capture at least a first image of a user's real world point of view;
 a second display for a user's second eye;
 a second motion sensor and/or a second externally facing image capture device configured to capture at least a second image of a user's real world scene; and
 a controller configured to:
  receive at least a first signal from: the first motion sensor and/or the first image capture device,
  receive at least a second signal from: the second motion sensor and/or the second image capture device,
  determine, based on the received at least first and second signals, a change in orientation of the first display with respect to the second display, and
  control display of first content on the first display in dependence on the determined change in orientation.

According to one or more examples of the disclosure there is provided a method comprising
 receiving at least a first signal from: a first motion sensor and/or a first externally facing image capture device configured to capture at least a first image of a user's real world point of view;
 receiving at least a second signal from: a second motion sensor and/or a second externally facing image capture device configured to capture at least a second image of a user's real world scene;
 determining, based on the received at least first and second signals, a change in orientation of a first display for a user's first eye with respect to a second display for a user's first eye; and
 controlling display of first content on the first display in dependence on the determined change in orientation.

According to one or more examples of the disclosure there is provided an apparatus comprising:
 at least one processor; and
 at least one memory including computer program code;
 the at least one memory and the computer program code configured to, with the at least one processor, cause the apparatus at least to perform:
  receiving at least a first signal from: a first motion sensor and/or a first externally facing image capture device configured to capture at least a first image of a user's real world point of view;
  receiving at least a second signal from: a second motion sensor and/or a second externally facing image capture device configured to capture at least a second image of a user's real world scene;
  determining, based on the received at least first and second signals, a change in orientation of a first display for a user's first eye with respect to a second display for a user's first eye; and
  controlling display of first content on the first display in dependence on the determined change in orientation.

According to one or more examples of the disclosure there is provided an apparatus comprising means configured to cause/enable the apparatus at least to perform:
 receiving at least a first signal from: a first motion sensor and/or a first externally facing image capture device configured to capture at least a first image of a user's real world point of view;
 receiving at least a second signal from: a second motion sensor and/or a second externally facing image capture device configured to capture at least a second image of a user's real world scene;
 determining, based on the received at least first and second signals, a change in orientation of a first display for a user's first eye with respect to a second display for a user's first eye; and
 controlling display of first content on the first display in dependence on the determined change in orientation.

According to one or more examples of the disclosure there is provided a computer program that, when performed by at least one processor, causes at least the following to be performed:

receiving at least a first signal from: a first motion sensor and/or a first externally facing image capture device configured to capture at least a first image of a user's real world point of view;

receiving at least a second signal from: a second motion sensor and/or a second externally facing image capture device configured to capture at least a second image of a user's real world scene;

determining, based on the received at least first and second signals, a change in orientation of a first display for a user's first eye with respect to a second display for a user's first eye; and controlling display of first content on the first display in dependence on the determined change in orientation.

According to one or more examples of the disclosure there is provided a non-transitory computer readable medium encoded with instructions that, when performed by at least one processor, causes at least the following to be performed:

receiving at least a first signal from: a first motion sensor and/or a first externally facing image capture device configured to capture at least a first image of a user's real world point of view;

receiving at least a second signal from: a second motion sensor and/or a second externally facing image capture device configured to capture at least a second image of a user's real world scene;

determining, based on the received at least first and second signals, a change in orientation of a first display for a user's first eye with respect to a second display for a user's first eye; and controlling display of first content on the first display in dependence on the determined change in orientation.

According to one or more examples of the disclosure there is provided a chipset or module comprising processing circuitry configured to perform the above method.

According to one or more examples of the disclosure there is provided a near eye display device comprising the above apparatus.

According to one or more examples of the disclosure there is provided an apparatus comprising:

a controller configured to:
  determine a first change in orientation of a first display for a user's first eye,
  determine a second change in orientation of a second display for a user's second eye,
  control the display of first content on the first display in dependence on the determined first change in orientation, and
  control the display of second content on the second display in dependence on the determined second change in orientation.

According to one or more examples of the disclosure there is provided a method comprising:

determining a first change in orientation of a first display for a user's first eye;

determining a second change in orientation of a second display for a user's second eye;

controlling the display of first content on the first display in dependence on the determined first change in orientation; and controlling the display of second content on the second display in dependence on the determined second change in orientation.

According to one or more examples of the disclosure there is provided a computer program that, when performed by at least one processor, causes at least the following to be performed:

determining a first change in orientation of a first display for a user's first eye; determining a second change in orientation of a second display for a user's second eye;

controlling the display of first content on the first display in dependence on the determined first change in orientation; and controlling the display of second content on the second display in dependence on the determined second change in orientation.

According to one or more examples of the disclosure there are provided examples as claimed in the appended claims.

BRIEF DESCRIPTION OF THE DRAWINGS

For a better understanding of various examples of the present disclosure that are useful for understanding the detailed description and certain embodiments of the invention, reference will now be made by way of example only to the accompanying drawings in which.

Figure 1:
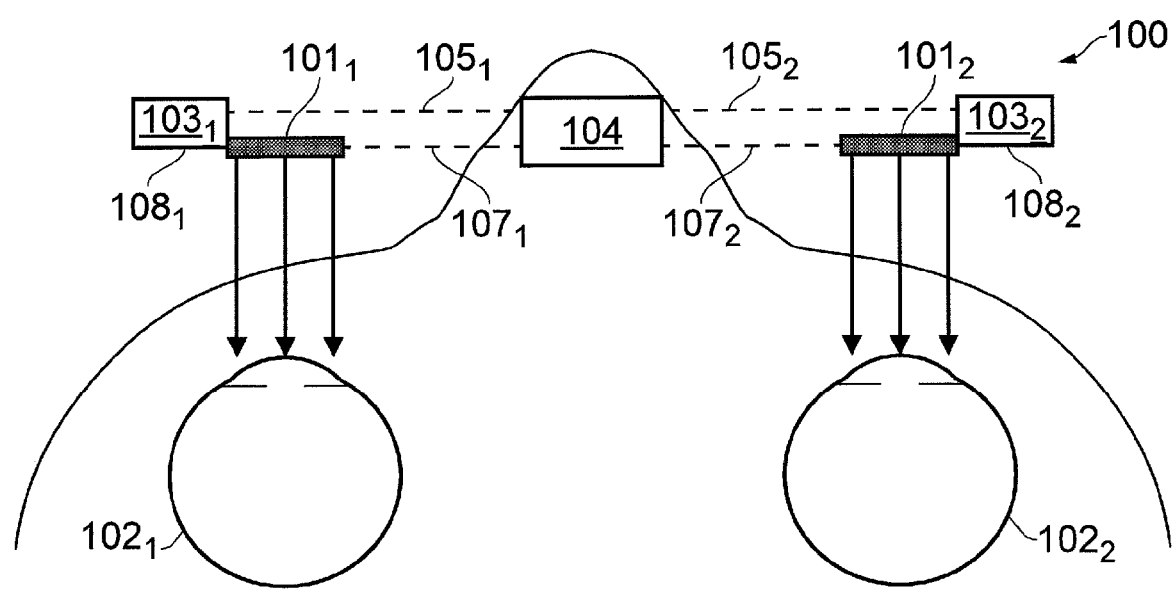
FIG. 1 schematically illustrates an apparatus.

The Figures are not necessarily to scale. Certain features and views of the figures may be shown schematically or exaggerated in scale in the interest of clarity and conciseness. For example, the dimensions of some elements in the figures may be exaggerated relative to other elements to aid explication. Similar reference numerals are used in the Figures to designate similar features. For clarity, all reference numerals are not necessarily displayed in all figures.

DETAILED DESCRIPTION

The Figures schematically illustrate an apparatus comprising:

a first display $101_1$ for a user's first eye $102_1$;

a first motion sensor $103_1$ and/or a first externally facing image capture device $103_1$ configured to capture a first image of a user's real world point of view;

a second display $101_2$ for a user's second eye $102_2$;

a second motion sensor $103_2$ and/or a second externally facing image capture device configured to capture a second image of a user's real world point of view; and a controller 104 configured to:

receive at least a first signal $105_1$ from: the first motion sensor and/or the first image capture device, receive at least a second signal $105_2$ from: the second motion sensor and/or the second image capture device, determine, based on the received at least first and second signals, a change in orientation $108_1'$ of the first display with respect to the second display, and control the display of first content $309_1$ on the first display in dependence on the determined change in orientation.

In some examples, the at least first/second signals may be: one or more images of the user's real world scene or external environment captured by the first/second image capture devices, and/or measurements from the first/second motion sensor [e.g. angular measurements from gyroscopes/accelerometer/magnetometers].

In some examples, the control of the display of first content $309_1$ on the first display in dependence on the determined change in orientation of the first display relative to the second display comprises: transforming the first content in dependence on the determined change in orientation, for example adjusting a position within the first display at which the first content is displayed, wherein the amount/degree of positional adjustment (e.g. panning) is proportional to the amount/degree of change in orientation.

For the purposes of illustration and not limitation, in some examples, such control of the display of the first content 3091 comprises outputting transformed first content $309_1'$. In this regard, the first content may be adjusted such that its displayed position within the first display, with respect to a frame of reference of the first display, is altered, e.g. moved within the first display. Such movement may comprise: laterally moving, vertically moving, shifting, panning, translating or rotating the first content with respect to the first display. For example horizontally shifting the first content (e.g. panning it along the x axis) by an amount (e.g. moving it along by X pixels along the x axis) in dependence on the determined change in the orientation of first and second displays. Such a movement of the displayed first content consequently changes the position of the displayed first content as perceived by the user in the user's frame of reference/field of view. The first content may be moved with respect to the first display such that the resultant perceived first content is moved with respect to the user's field of view so as to be brought into appropriate alignment (e.g. alignment with perceived second content, in the user's field of view, that is displayed in the second display). Consequently, such movement of the first content may compensate for the change in orientation of the first display, thereby actively maintaining optimal alignment (i.e. maintain a factory/preset alignment where the first display has a reference/default/pre-determined/initial orientation, e.g. with respect to a particular frame of reference such as with respect a reference/default/pre-determined/initial orientation of the second display). A similar process may be effected to control of the display of second content on the second display. For example, second content may be moved up, down, left or right within the second display so as to align the second content so as to compensate for a change in orientation of the second display.

The above processes may be repeated and/or continuously performed (e.g. in real time) so as to provide continuous active image alignment for each display, thereby providing real-time compensation for and changes in the relative orientations of the first and second displays.

In some examples, the apparatus is a binocular near eye display, wherein each eye of a user is provided with its own display.

In some examples, the first display may be flexibly coupled, e.g. flexibly mechanically coupled or rotatably coupled, to the second display. Since continuous active image alignment for each display may be performed, it is not necessary for examples of the apparatus to have a robust structural support/frame/bridge rigidly mounting and connecting the first and second displays together. Instead, a flexible support/frame/bridge (not shown) can be provided to flexibly mount and connect the first and second displays together. Such a flexible binocular display device may increase user comfort when worn and used and may enable the apparatus to better conform and adapt to a size and shape of a user's face (as compared to a rigid/stiff binocular display device). Also, lighter weight flexible materials may be used for the apparatus (rather than heavier rigid/robust materials) which may further enhance user comfort when wearing and using the apparatus for extended period of time.

The first and second image capture devices, and/or the first and second motion sensors, may be directly or indirectly rigidly coupled to their respective first and second displays. This enables any detected changes of orientation of first and second image capture devices and/or the first and second motion sensors can be equated to and correspond to changes in orientation of the respective first and second displays. Accordingly, the first image capture device and/or a first motion sensor can be used to detect and sense orientation changes of the first display, e.g. relative to a reference orientation or pose (such as an initial/default orientation of the first display relative to an initial/default orientation of the second display [based on which an initial calibration/alignment was performed]). Likewise, the second image capture device and/or second motion sensor can be used to detect and sense orientation changes of the second display, e.g. relative to a reference orientation or pose (such as an initial/default orientation of the second display relative to an initial/default orientation of the first display). The display of first and second content in the first and second displays can then be controlled in dependence on the determined changes in the orientation of the first and second displays, so as to restore alignment of the first and second displayed content as perceived by the user in the user's field of view.

In some examples, the first and second externally facing image capture devices may be, for example: an image sensor or a digital image sensor that is configured to operate as an outwardly facing camera, i.e. facing in the direction of the user's field of view, such that one or more static images and/or video images of the user's real world scene may be captured and/or recorded. Determination of an orientation change via an image capture device may be effected in any appropriate manner, not least for example by continually capturing images and performing image analysis of the same. In some examples, an object recognition algorithm may be applied to the captured image of a real world scene to identify an imaged object and track movement/orientation changes of the imaged object. Such tracked movement/orientation changes, particularly for fixed/stationary objects, e.g. buildings, may be indicative of a change in orientation of the camera. Moreover, by performing such movement/orientation tracking for both the first and second cameras, an account can be made for gross movement (i.e. movement of a user's head) that would move both the first and second cameras in a same manner such that there would be no net movement or orientation change of one display relative to the other. This may enable just movement/orientation changes of the first camera relative to the second camera to be determined. In various examples, since the image capture devices are rigidly coupled to their respective displays, any detected change of orientation can be equated/mapped onto a change in orientation of the respective display.

In some examples, the motion sensors may be, for example: an orientation sensor, an accelerometer, an electronic gyroscope, an electronic compass or other means to sense, measure and/or determine a change in an orientation such as angular rotations relative to an axis/frame of reference (e.g. yaw, pitch and/or roll). In various examples, since the motion sensors are rigidly coupled to their respective displays, any detected change of orientation consequently corresponds to a change in orientation of the respective display.

In some examples, the displays may be, not least for example, one or more of: a conventional direct view display, a projection based display, a Near Eye Display (NED), a Head Mountable Display (HMD), a stereoscopic display, a 3D display, a Virtual Reality (VR) display, an Augmented Reality (AR) display, a Mixed Reality (MR) display, a Heads-Up Display (HUD), a see-though display, an opto-electronic display and an exit pupil expander based display.

Figure 2:
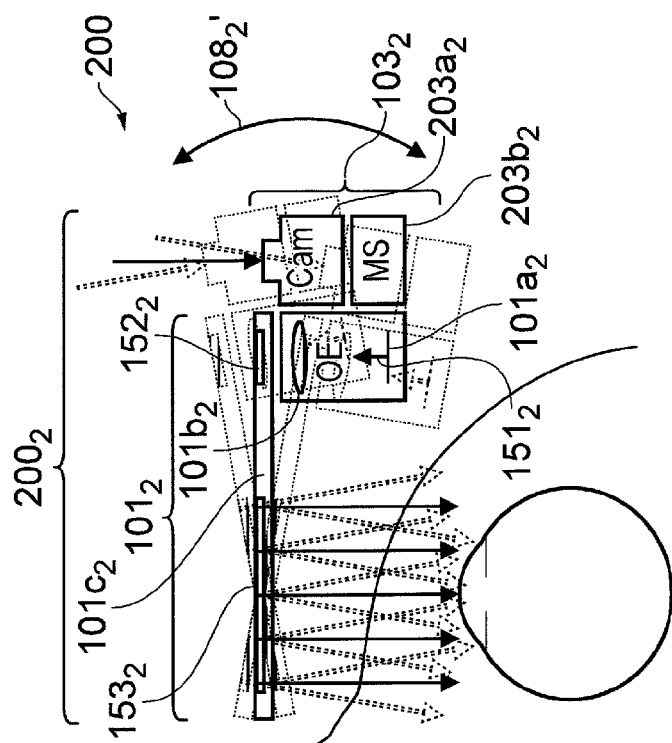
FIG. 2 schematically illustrates a further apparatus.
Figure 2:
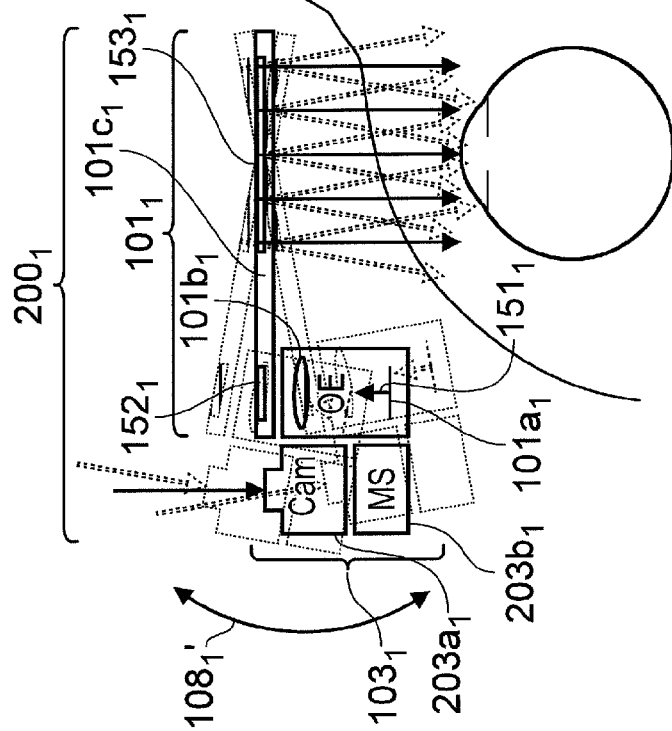

FIG. 2 schematically illustrates an apparatus 200 similar to that of apparatus 100 of FIG. 1. In the apparatus 200, the first and second displays $101_1$ and $101_2$ are exit pupil expander based displays, comprising a micro display $101a_1$, an optical engine $101b_1$ and an Exit Pupil Expander (EPE) $101c_1$. First content, e.g. a first image beam $151_1$, is generated by the microdisplay, which passes through the optical engine to produce an input beam which is incident to an in coupling diffraction grating $152_1$ that in-couples the input beam into the EPE. The beam is totally internally reflected along the EPE and outputted via an out-coupling diffraction $153_1$ grating to the user's eye. A similar EPE display module is provided for the user's other eye.

In the apparatus 200, a first image capture device $203a_1$ and a first motion sensor $203b_1$ are rigidly coupled to the first display $101_1$. This may be provided in a first module $200_1$. Likewise, a second image capture device and a second motion sensor are provided for the second display $101_2$, which may be provided in a second module $200_2$ flexibly or rotatably mechanically coupled to the first module. The motion sensors and image capture devices/cameras can either be used separately or in combination to determine orientation changes. For example, motion sensors are typically very stable in the short run but their accuracy may drift over time. On the other hand, an environment tracking camera may fail occasionally, but two cameras are likely to detect common points of interest from a scene most of the time. Camera tracking can thus be used for compensating the motion sensor drift.

The first image capture device and the first motion sensor are used to determine a first change $108_1$ in a first orientation of the first display. The change in the orientation may be in reference to a reference orientation, e.g. a default orientation such as an initial orientation at which a prior calibration, alignment had been effected. The first change in orientation $108_1$ is used to control the display of first content on the first display. The control of the display of first content on the first display may comprise adjusting the position of the first content within the first display dependent on the determined first change in orientation $108_1$.

Similarly, the second image capture device and the second motion sensor are used to determine a second change $108_2$ in a second orientation of the second display. The second change in orientation $108_2$ is used to control the display of second content on the second display. The control of the display of second content on the second display may comprise adjusting the position of the second content within the second display dependent on the determined second change in orientation $108_2$.

In some examples, the image capture devices are configured to capture images both of their respective displays as well as their respective real world scenes. This can be used to further improve the relative tracking accuracy of the image capture devices and reduce the robustness/rigidity requirement of the apparatus and rigidity of its per eye display modules $200_1$, $200_2$. The captured images can optionally be sequentially separated. In some examples, such an operation can be achieved by using an image capture device capturing the view of the real world scene through a display waveguide and accompanying active shutter elements (i.e. an exit pupil expander and liquid crystal shutters).

In some examples, the first content and/or the second content may be: an image (static of dynamic), video, graphical user interface element, visual element, augmented reality content, virtual reality content or any other type of content. The (unadjusted) first and second content may be displayed such that it is fixed relative to a frame of reference to the first and/or second displays, or it may be displayed such that it is fixed relative to a frame of reference of the user's point of view. The first content and/or the second content may be mediated reality content, such as augmented reality content (as shown in FIGS. 3 to 8). Such mediated reality content may be fixed relative to the real world. Irrespective of whether to the first content and/or the second content is real world fixed or display fixed, the first content and/or the second content is (further) adjusted with respect to its position within its respective first and second displays dependent upon the determined change in orientation of the first and second displays. The first content may be mixed AR content and GUI content (i.e. the first content may comprise both display fixed and real work fixed content) as shown in FIG. 8 below.

Figure 3:
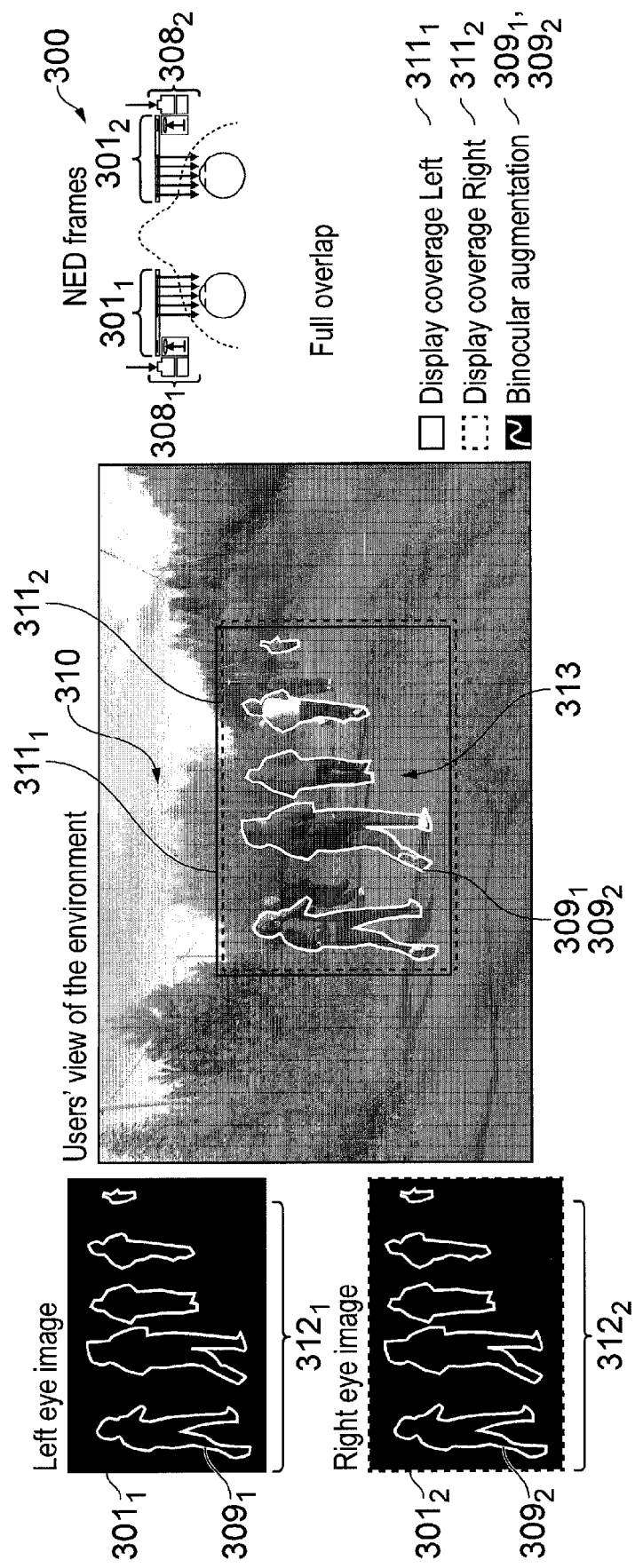
FIG. 3 schematically illustrates an example of binocular display of content on an apparatus.

FIG. 3 schematically illustrates (on the right hand side part of the Figure) an apparatus 300, having a first display $301_1$ and a second display $302_2$. FIG. 3 also illustrates (on the left hand side part of the Figure) first content $309_1$ displayed within the first display $301_1$, and second content $309_2$ displayed within the second display $301_2$. Finally, FIG. 4 also illustrates (in the central part of the Figure) a user's field of view 310 along with a first display region $311_1$ and a second display region $311_2$. The first display region $311_1$ corresponds to a region of the user's field of view that is occupied by the first display, i.e. the area of the user's field of view where the user perceives content displayed on the first display. Similarly, the second display region $311_2$ corresponds to a region of the user's field of view occupied by the second display, where the user perceives content displayed on the second display.

The apparatus is shown in a reference/default/initial configuration wherein the first display is in a first reference orientation $308_1$ and the second display is in a second reference orientation $308_2$. In the particular example shown in FIG. 3, the two displays are parallel to one another. In such as default/reference configuration/orientation, there is no change in orientation of the first and second displays. In certain examples, the reference/default/initial configuration/orientation may correspond to a configuration of apparatus, i.e. an orientation of its first and second displays at which the apparatus had been pre-calibrated and pre-configured such that in the reference/default/initial configuration, the displays (and images presented thereon) and the display coverage regions are optimally aligned, namely such that the first and second display regions substantially overlap with one another.

Some, but not necessarily all, examples of the present disclosure provide an apparatus for displaying a mediated reality, such as an Augmented Reality (AR) or a Virtual Reality (VR).

Mediated reality refers to a user visually experiencing a fully or partially artificial environment (a virtual space) as a virtual scene at least partially displayed, by the apparatus, to a user. The virtual scene is determined by a point of view within the virtual space and a field of view. Displaying the virtual scene means providing it in a form that can be seen/perceived by the user. Virtual space refers to a fully or partially artificial environment, which may be three dimensional. Virtual scene refers to a representation of the virtual space viewed from a particular point of view within the virtual space.

Augmented reality refers to a form of mediated reality in which a user visually experiences a partially artificial environment (a virtual space) as a virtual scene comprising a real scene of a physical real world environment (real space) supplemented by one or more visual elements displayed by an apparatus to a user. Real space refers to a real environment, which may be three dimensional. Real scene refers to a representation of the real space viewed from a particular point of view within the real space. Real scene may also refer to a real space viewed from a particular point of view within the real space that is "directly" observed by a viewer (c.f. displayed to a user). For example, a user may directly observe a real scene by looking through a see though display.

Virtual reality refers to a form of mediated reality in which a user visually experiences a fully artificial environment (a virtual space) as a virtual scene displayed by the display device.

The mediated reality (e.g. augmented reality or virtual reality) may be "perspective-mediated" meaning that user actions determine the point of view within the virtual space thereby changing the virtual scene. The mediated reality may be "first person perspective-mediated". This means perspective mediated with the additional constraint that the user's real point of view determines the point of view within the virtual space. Content rendered in "first person perspective-mediated" mediated reality is referred to as "real world fixed" content. For example, the positioning of the content displayed is dependent on an orientation of the user's NED such that the displayed position of the content is adjusted to as to be perceived to be fixed with respect to a frame of reference of user's real point of view/field of view.

In some examples, the first and second image capture devices may be configured so as to capture images of a real world scene from the perspective of the user's first and second eye's respectively. The first and second image capture devices may thus be used not only to determine a change in orientation for the displays with respect to one another, but may also be used in the generation of mediated reality content, e.g. augmented reality (or virtual reality) content that is displayed on the displays. Thus such examples enable efficient use/reutilisation of the first and second displays.

In FIG. 3, the apparatus 300 provides an Augmented Reality (AR) display device, in that the user visually experiences a real scene of a physical real world environment (real space—the real world view of the people jogging) supplemented by one or more displayed visual elements (virtual space—the first content $309_1$ and second content $309_2$ of the outline/highlight of the people jogging).

The first and second content $309_1$ and $309_2$, is augmented reality content that is "first person perspective-mediated"/ "real world fixed" content wherein the positioning of the AR content displayed is dependent on the user's field of view such that the displayed position of the AR content is adjusted to as to be perceived to be fixed with respect to a frame of reference of user's real point of view/field of view at a particular instance in time.

In the example of FIG. 3, the first and second display coverage regions substantially coincide, i.e. substantially entirely overlap with one another. The overlapping region is referred to as a binocular region 313. In this region a user perceives binocular overlap of the first and second displays. In the binocular region, binocular augmentation may be provided, i.e. wherein augmentation of a real world object may be provided by both the first and second displays (and in particular part of first and second content displayed in the first and second binocular portions of the first and second displays whose output therefrom is perceived in the binocular region). Such first and second content displayed in respective first and second binocular portions of the first and second displays whose output therefrom is perceived in the binocular region is referred to as binocular content.

The parts of the first and second content that form binocular content may be the same content or substantially the same content (e.g. same content albeit slightly differently aligned/positioned, or from a slightly differing perspective). In some examples, binocular content may comprise stereoscopic content, i.e. wherein first and second content/images form stereoscopic content/image. Such first and second images/content, when viewed by a viewer, are fused together by the viewers visual system and perceived as 3D image/ content with depth perception The ability to provide binocular augmentation via the display of binocular content may enable the ability to provide augmented content that is perceived in 3D, i.e. augmented content with depth perception. Where the first and second content are configured as part of stereoscopic content, i.e. a left hand image and right hand image of a stereoscopic image, the display of such stereoscopic content would be seen in the binocular region and would be fused together by the user's visual system and perceived at 3D content with depth perception.

In the example of FIG. 3, the apparatus is in a reference/ default/optimal configuration and alignment where the binocular region is maximal in its extent/size, i.e. the first and second display coverage regions substantially coincide with one another such that substantially the entirety of the first display coverage region overlaps with substantially the entirety of the second display coverage region. Thus, the binocular region corresponds to substantially the entirety of the first display coverage region, and the binocular region also corresponds to substantially the entirety of the second display coverage region. Consequently, in such a configuration, a first portion $312_1$, of the first display which corresponds to the first display coverage region (and which, in the example of FIG. 3 also corresponds to the binocular region) equates to substantially the entirety of the first display, i.e. the entirety of the output from the first portion of the first display is perceived in the binocular region of the user's field of view. Likewise, a second portion $312_2$, of the second display which corresponds to the second display coverage region (and which, in the example of FIG. 3 also corresponds to the binocular region) equates to substantially the entirety of the second display, i.e. the entirety of the output from the second portion of the second display is perceived in the binocular region of the user's field of view.

Such portions $312_1$ and $312_2$ of the first and second displays whose displayed output therefrom is perceived in the overlapping portions of their respective first and second display coverage regions (i.e. the binocular region of the user's field of view) are referred to respectively as: a first binocular portion $312_1$ of the first display, and a second binocular portion $312_2$ of the second display.

FIG. 3 illustrates "full binocular display", wherein the first content to be displayed is within the first binocular portion $312_1$ of the first display and wherein second content to be displayed is within the second binocular portion $312_2$ of the second display, i.e. there is no content displayed outside of the first and second binocular portions and hence there is no content perceived outside of the binocular region.

Figure 4:
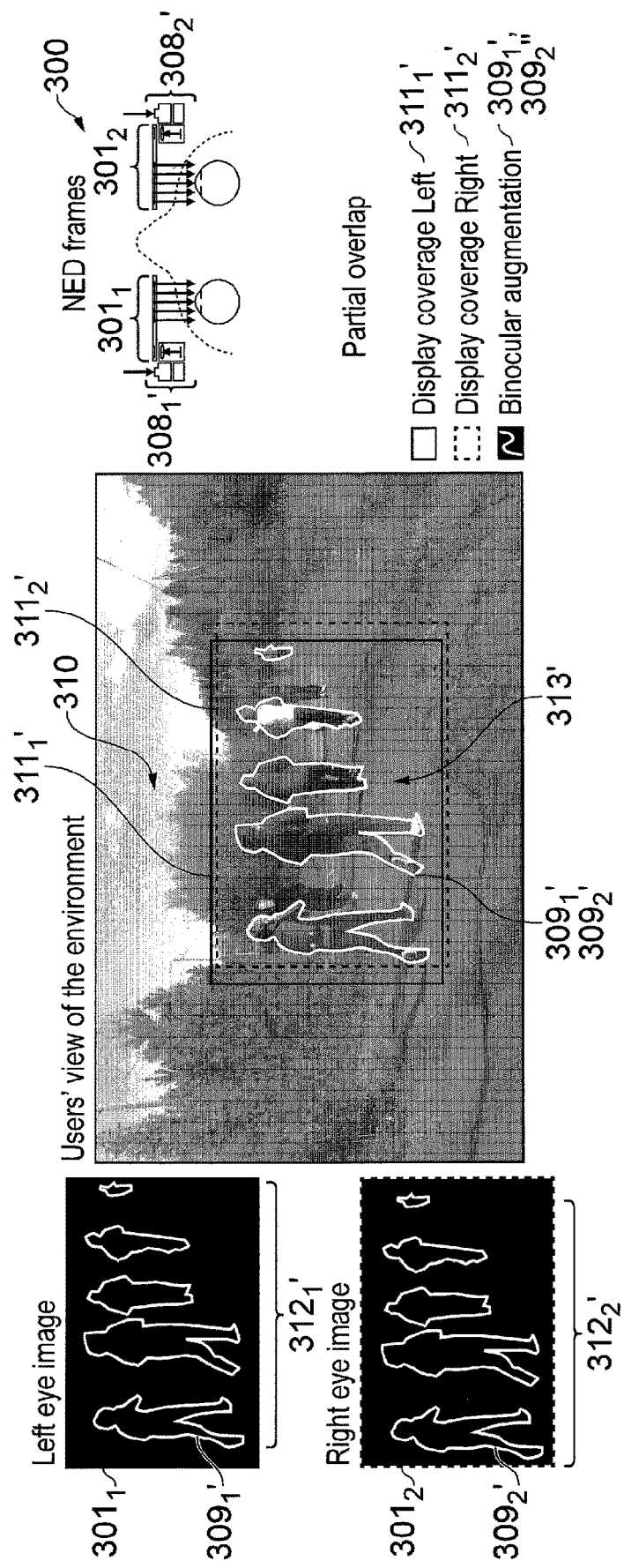
FIG. 4 schematically illustrates a further example of binocular display of content on an apparatus.

FIG. 4 schematically illustrates a further example of full binocular display on the apparatus 300 wherein there a change in orientation $308_1'$ $308_2'$ of each of the first and second displays $301_1$ $301_2$ has been detected. In the illustrated example, the first (left hand) display $301_1$ is no longer parallel to the second (right hand) display $301_2$. Looking down on the apparatus (as shown on the right hand side part of FIG. 4), the first (left eye's) display $301_1$ has been rotated slightly counter clockwise, whilst the second (right eye's) display $301_2$ has been rotated slightly clockwise. Whilst only "yaw" type rotations/changes in orientation are shown, it is to be appreciated that other types of changes in orientation may be accommodated for, e.g. "pitch" and "roll" type rotations with appropriate adjustments to the displayed content to accommodate for the same (e.g. panning the displayed content vertically up/down, or rotating the displayed content clockwise/counter clockwise).

Based on signals (e.g. captured images or orientation measurements) received from: the first and second image capture devices and/or the first and second motion sensors, the change in the orientation $308_1'$ of the first display and the change in the orientation $308_2'$ of the second display is determined, e.g. an amount of angular rotation about respective reference axes. Based on this, the display of the first content is adjusted and the display of the second content is adjusted.

In this regard, one may equate the unadjusted first content with FIG. 3's first content $309_1$, i.e. first content that would be displayed were the first and second displays in an initial/reference orientation $308_1$ $308_2$ such that there were no detected change in the orientation of the two displays.

The first content is then adjusted by applying a transformation to the first content, such as moving a position within the first display at which the first content is displayed. If one were to compare the unadjusted first content $309_1$ of FIG. 3 against the adjusted first content $309_1'$ of FIG. 4, the relative positions of the content within the first display differs. The first content $309_1'$ has been shifted to the right, the amount by which the first content is shifted is dependent on the determined amount of change of orientation of the first display. This shifting of the first content compensates for the change in orientation of the first display and enables maintenance of the alignment of the first content in spite of a change in orientation of the first display.

Similarly the second content is adjusted by moving a position within the second display at which the second content is displayed. If one were to compare the unadjusted second content $309_2$ of FIG. 3 against the adjusted second content $309_2'$ of FIG. 4, the relative positions of the content within the second display differs. The first content $309_1'$ has been shifted to the left by an amount dependent on the determined amount of change of orientation of the second display. This shifting of the second content compensates for the change in orientation of the second display and enables maintenance of the alignment of the second content in spite of a change in orientation of the second display. Thus the apparatus may enable re-configuration/re-calibration to adjust the first and second content displayed on the first and second displays so as to restore alignment/bring the displayed first and second content back into alignment in spite of the change in orientation of the displays (e.g. due to change of shape of the apparatus).

In the example of FIG. 4, there is a change in orientation $308_1'$ of the first display which affects the position of the first display coverage region $311_1'$ in the user's field of view 310. Likewise, there is a change in orientation $308_2'$ of the second display which affects the position of the second display coverage region $311_2'$ in the user's field of view. Consequently, the region of overlap, the binocular region 313', is likewise altered due to changes in orientation of the first and second displays.

In the example of FIG. 4, the binocular content displayed, i.e. the first and second content $309_1'$ and $309_2'$ displayed in the first and second binocular portions of the first and second displays, is adjusted content, i.e. content that has been adjusted/shifted with respect to its display. The content may be augmented content that is real world fixed, i.e. its displayed position is contingent on the real world position in the user's field of view (such that is the object were to move, or the user's field of view were to move, the displayed position on the augmented content within its respective display would move in dependent upon such movement). The display of such real world fixed augmented content in its respective displays is further transformed, e.g. adjusted/moved in position in dependent on the determined change in orientation of its respective display.

In the example of FIG. 4, due to the relatively minor amount of change of orientation of the first and second display, the effect of the same on the binocular region 313' is relatively minor. The first and second display coverage regions still substantially overlap one another and such that "full binocular display" may be maintained, i.e. the first content to be displayed is within the first binocular portion $312_1'$ of the first display and wherein second content to be displayed is within the second binocular portion $312_2'$ of the second display, i.e. there is no content displayed outside of the first and second binocular portions and hence there is no content perceived outside of the binocular region. Such a display mode may be selected where there is substantial overlap the first and second display coverage regions in the user's field of view.

Figure 5:
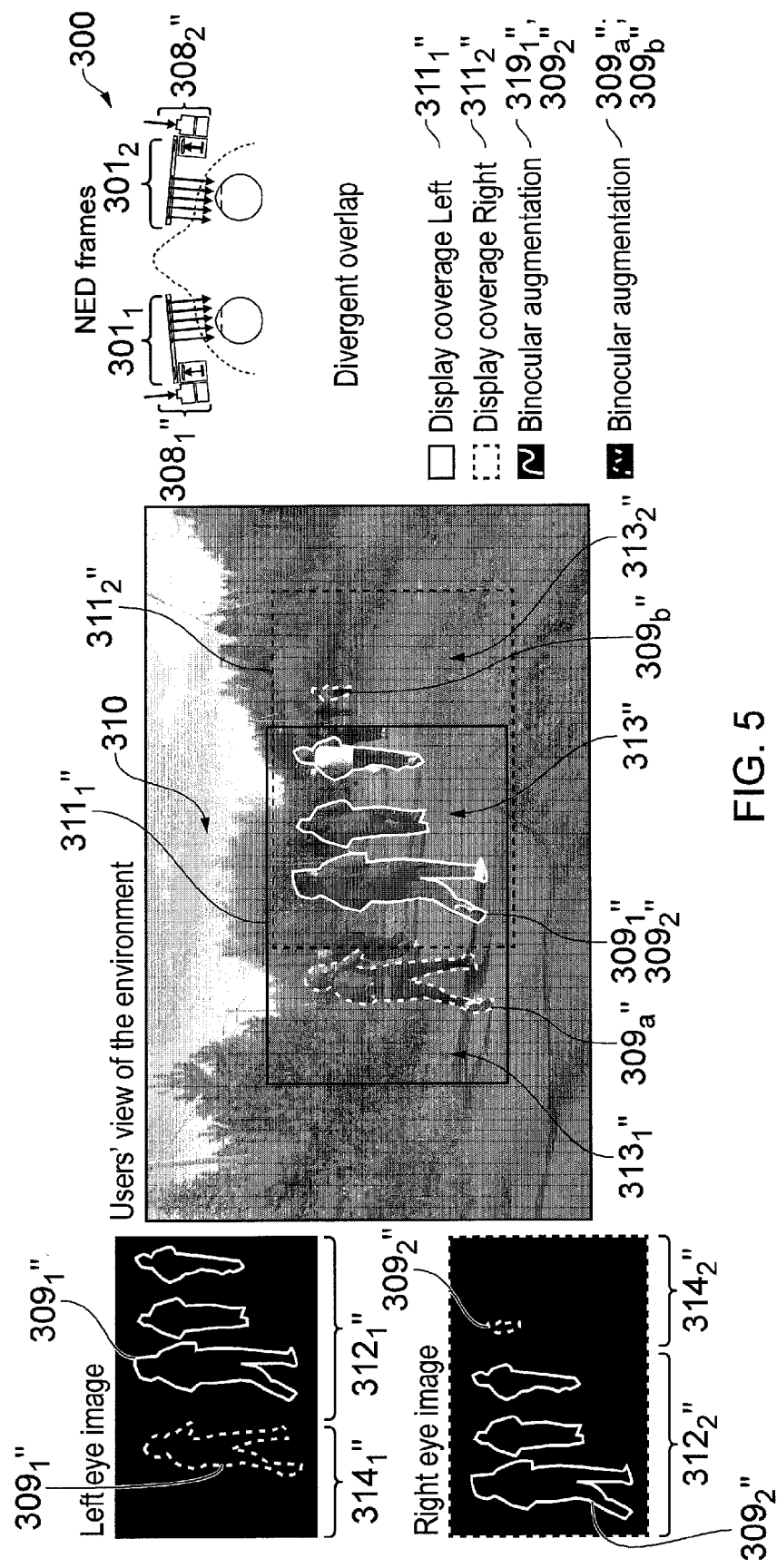
FIG. 5 schematically illustrates an example of partial binocular display and partial monocular display of content on an apparatus.

FIG. 5 schematically illustrates an example of "partial binocular display", wherein partial binocular display and partial monocular display is provided on the apparatus 300. In the example of FIG. 5, there is a larger amount of change of orientation of the first and second displays $308_1''$ and $308_2''$. This results in a greater degree of change in the positions of the first and second display coverage regions $311_1''$ and $311_2''$ within the user's field of view and reduces the size of the overlap/binocular region 313''. The reduced size of the binocular region, in combination with the adjustment of the first content (shifting the first content $309_1''$ to the right) results in a part of the adjusted first content not being displayed in the first binocular portion of the first display $312_1''$. Instead, such content is displayed in a monocular portion $314_1''$ of the first display, i.e. a portion of the first display outside of the first binocular portion of the first display. The first monocular portion of the first display corresponds to a portion of the first display whose output is perceived in a region of the first display coverage region that is outside of the binocular region, i.e. a region of the first display coverage region that does not overlap with the second display coverage region. Such a region of the first display coverage region outside of the binocular region is referred to as a first monocular region $313_1''$.

Similarly, the reduced size of the binocular region, in combination with the adjustment of the second content (shifting the second content $309_2''$ to the left) results in certain of the adjusted second content not being displayed in the second binocular portion of the second display $312_2''$. Instead, such content is displayed in a monocular portion $314_2''$ of the second display, i.e. a portion of the second display outside of the second binocular portion of the second display. The second monocular portion of the second display corresponds to a portion of the second display whose output is perceived in a region of the second display coverage region that is outside of the binocular region, i.e. a region of the second display coverage region that does not overlap with the first display coverage region. Such a region of the second display coverage region outside of the binocular region is referred to as a second monocular region $313_2''$.

In the example of FIG. 5, the first content to be displayed, i.e. the adjusted first content $309_1''$ is not all within the first binocular portion $312_1''$ of the first display. Instead, there is part of the first content $309a''$ that is displayed outside of the first binocular portion of the first display. The portion of the first display outside of the first binocular portion is referred to as a first monocular portion $314_1''$ of the first display. Similarly, with regards to the second content to be displayed, i.e. the adjusted second content $309_2''$, it is not all within the second binocular portion $312_2'$ of the second display. Instead, there is part of the second content $309b''$ that is displayed outside of the second binocular portion of the second display. The portion of the second display outside of the second binocular portion is referred to as a second monocular portion $314_2''$ of the second display.

In the example of FIG. 5, due to the type of change in orientation undergone by the first and second displays (a toe-out divergent movement), the first monocular region $313_1''$ is on a first side of the binocular region. The second monocular region $313_2''$ is on a second side of the binocular region. The part of the first content $309a''$ that is displayed in outside of the first binocular portion of the first display is on a first side (left hand side) of the first display. The part of the second content $309b''$ that is displayed outside of the second binocular portion of the second display is on a second side (right hand side) of the second display. Under such circumstances, the additional first and second content may be displayed so as to extend the region of augmentation, i.e. binocular augmentation (via both of the first and second displays) is effected in the binocular region of the user's field of view and monocular augmentation (by one of first and second displays) is effected in the first and second monocular regions of the user's field of view. Such a display mode may be selected where there is partial overlap (and no cross over—see below with respect to FIG. 6) of the first and second display coverage regions in the user's field of view.

Figure 6:
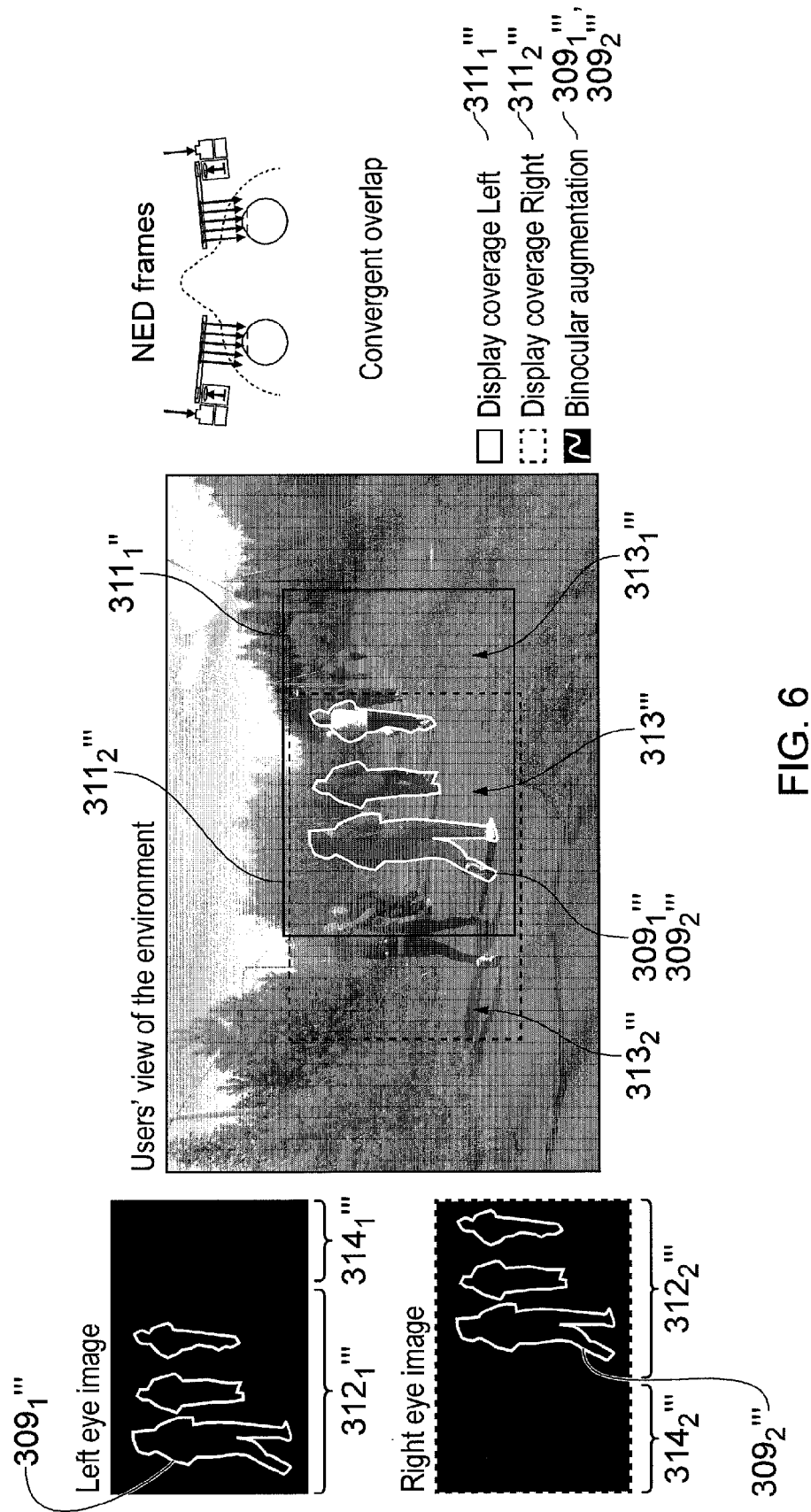
FIG. 6 schematically illustrates an example of partial binocular display and no monocular display of content on an apparatus.

FIG. 6 schematically illustrates an example of partial binocular display where there is no monocular augmentation, i.e. monocular augmentation (by one of the first and second displays for the left and right eyes respectively) is precluded in the monocular regions of the user's field of view. In the example of FIG. 6, due to the type of change in orientation undergone by the first and second displays (a toe-in convergent movement) the first display coverage region $311_1'''$ has crossed over and past the second display coverage region $311_2'''$, such that the first monocular region $313_1''$ of the first display (the left hand side display) is on the second side (right hand side). Similarly, the second display region $311_2'''$ has crossed over past the first display region $311_1'''$, such that the second monocular region $313_2''$ of the second display (the right hand side display) is on the first side (left hand side). Under such circumstances, no first or second content is displayed, to preclude any monocular augmentation (by one of first and second displays) in the first and second monocular regions as this would give rise to stereoscopic window/frame violation, user discomfort and eye strain. Such a display mode may be selected where there is partial overlap and cross over of the first and second display coverage regions in the user's field of view.

In FIG. 6, the display of content $309_1'''$ and $309_2'''$, e.g. augmented content such as real world fixed augmented content, is limited to only content within the determined first and second binocular portions $312_1'''$ and $312_2'''$ of the first and second displays (whose output therefrom is perceived in the binocular region $313'''$). Such a limiting of content within the first and second binocular portions and preclusion of content outside of the first and second binocular portions (i.e. preventing any content in the first and second monocular portions $314_1'''$ and $314_2'''$) may comprise cropping or trimming the content that would otherwise be in the monocular portions $314_1'''$ and $314_2'''$ of the first and second displays.

Figure 7:
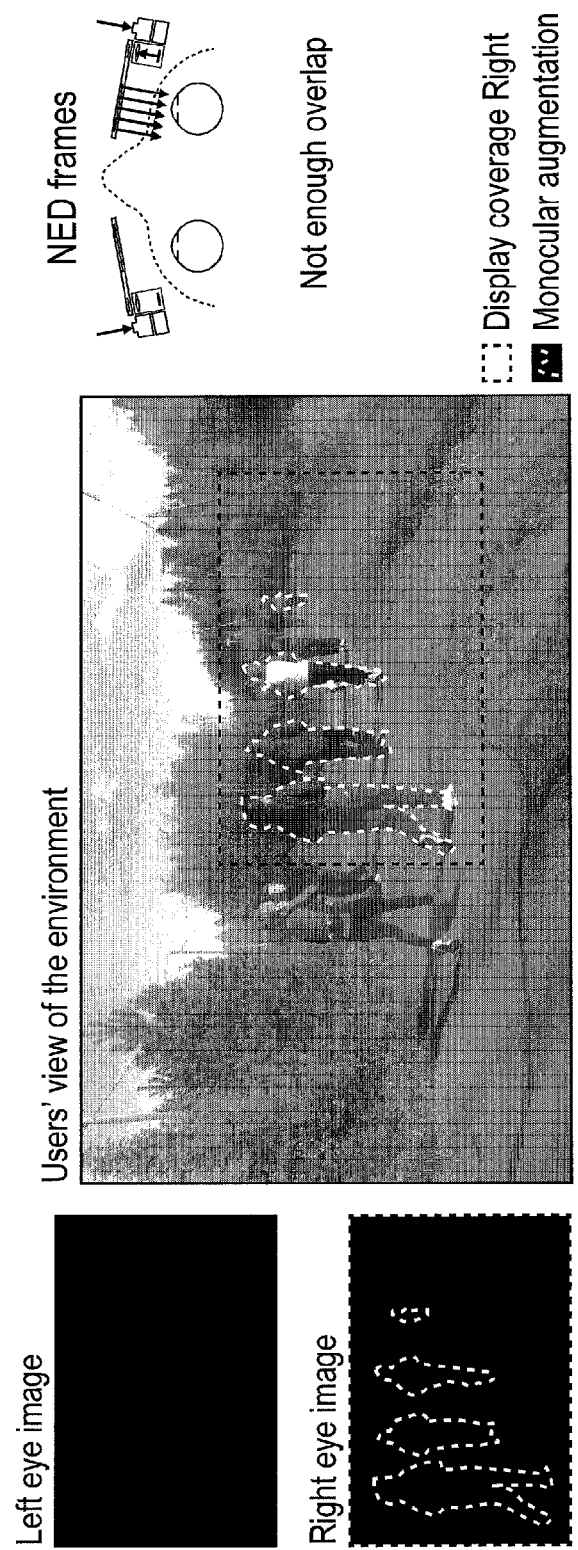
FIG. 7 schematically illustrates an example of single monocular display of content on an apparatus.
Figure 8:
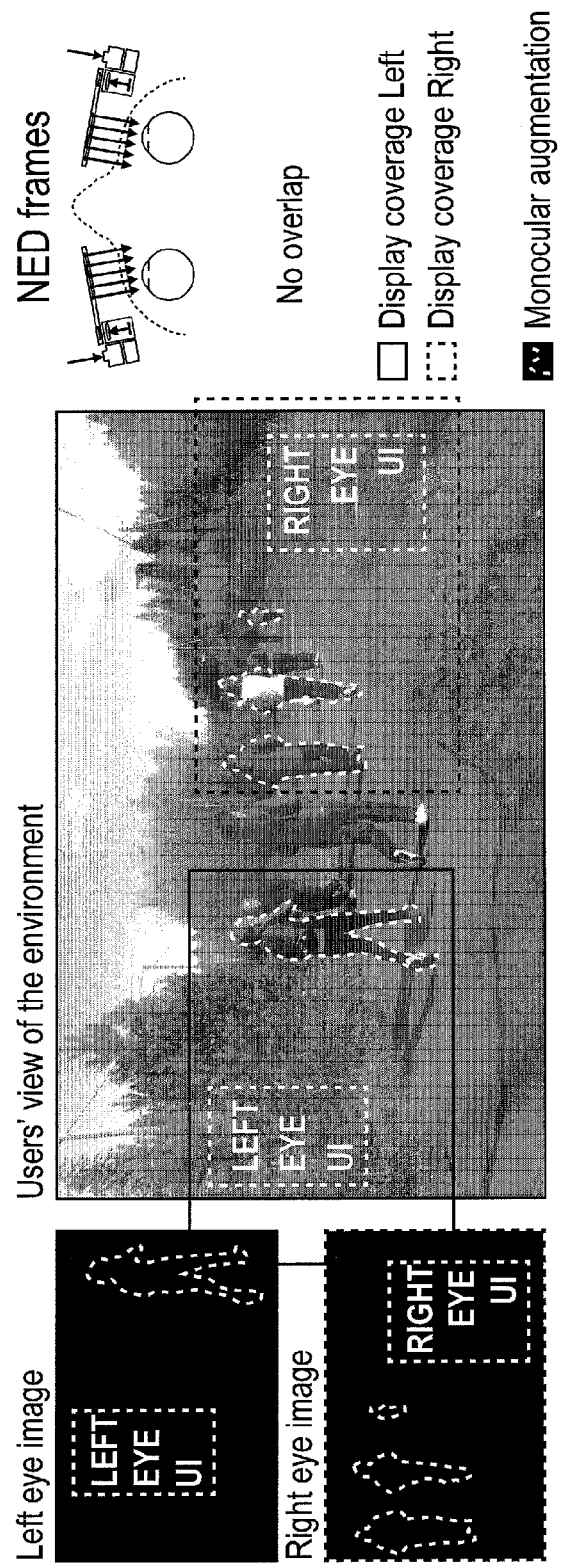
FIG. 8 schematically illustrates an example of dual monocular display of content on an apparatus.

FIG. 7 schematically illustrates an example of monocular display where there is only monocular content displayed, in this case single monocular augmentation just by the second display in the second display coverage region of the user's field of view. The first display may be precluded from displaying any content. Such a monocular display mode may be selected where there is no overlap of the first and second display coverage regions in the user's field of view and/or wherein a power saving mode is desired (i.e. only utilising, operating and powering a single display).

FIG. 8 schematically illustrates an example of dual monocular displays where there is dual monocular augmentation, i.e. monocular augmentation (by the first display) in the first display coverage region of the user's field of view and monocular augmentation (by the second display) in the second display coverage region of the user's field of view. Such a display mode may be selected where there is no overlap of the first and second display coverage regions in the user's field of view. The first and/or second content displayed may comprise augmented content that is real world fixed, e.g. whose position follows/tracks objects in the real world (such as the joggers). first and/or second content displayed may additionally or alternatively comprise graphical user interface elements or other content which is fixed relative to the respective first and second displays.

In some examples, the apparatus may determine that there is a failure in the tracking of the orientations of the first and/or the second displays, or that there is a detection of sub-optimal tracking performance (such as detection of contradicting orientation signals from the first image capture devices and the first motion sensor, or contradicting signals from some other related measurements). Upon detection of such a failure or sub-optimal tracking, this may trigger a change in operation of the apparatus; for examples displaying content in a monocular display mode, or using default alignment settings.

Figure 9A:
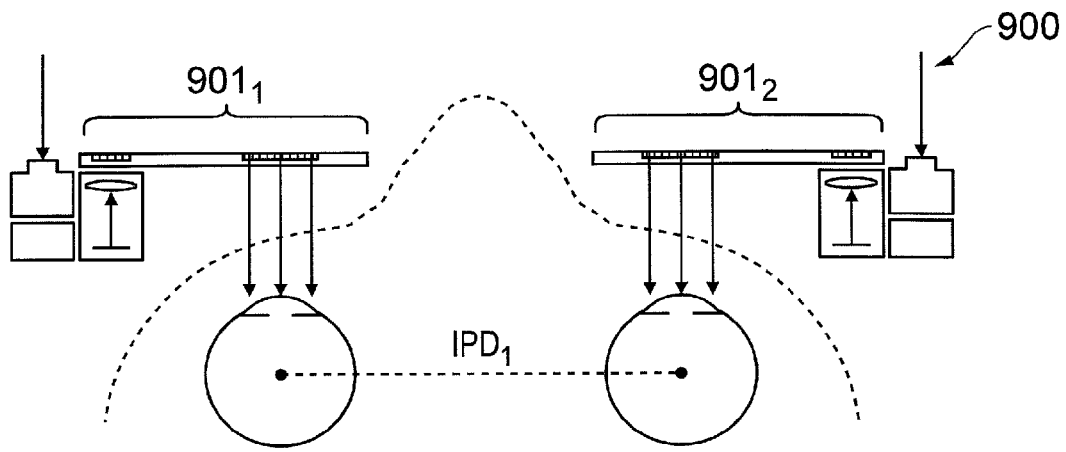
FIGS. 9A-9C schematically illustrate an apparatus accommodating differing interpupillary distances.
Figure 9B:
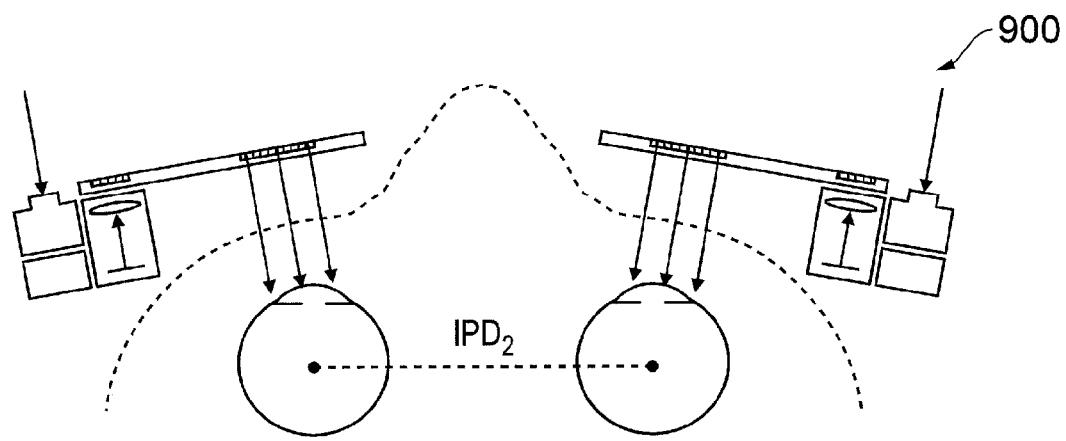
Figure 9C:
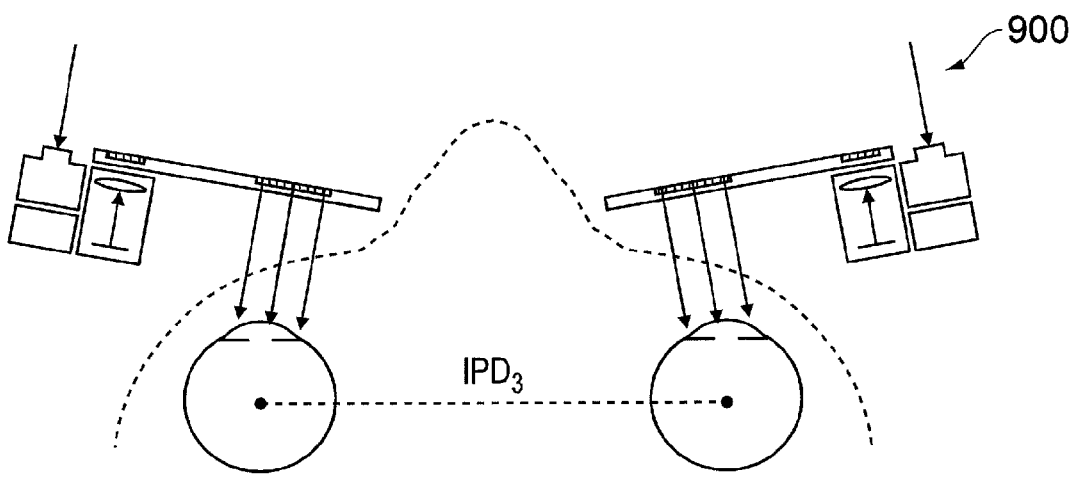

FIGS. 9A-9C schematically illustrate a binocular EPE based display apparatus 900 that can accommodate differing interpupillary distances: $IPD_1$, $IPD_2$ and $IPD_3$, where $IPD_2<IPD_1<IPD_3$. The first $901_1$ and second $901_2$ displays of the apparatus are flexibly coupled to one another, e.g. via a flexible bridge or other mount/support structure (not shown). The apparatus may be initially configured and calibrated for an average interpupillary distance $IPD_1$ of a typical first user. However, where a user, having a shorter interpupillary distance $IPD_2$, uses the apparatus 900, due to flexible coupling of the first and second display as well as the apparatus' ability to accommodate differing orientations of the first and second displays, the apparatus is able to bend (in a "toe-out" manner) thereby effectively narrowing the output beam separation distance of the exit pupil expander and thereby accommodating the shorter interpupillary distance $IPD_2$. Where yet another user, having a larger interpupillary distance $IPD_3$, uses the apparatus 900, the apparatus is able to bend (in a "toe-in" manner) thereby effectively widening out the output beams of the exit pupil expander and thus accommodating the larger interpupillary distance $IPD_3$.

Where the apparatus's displays are EPE based and have limited exit-pupil, simple adjustment of the shape of the apparatus (and change in orientation of the displays) can be used for the IPD adjustment. Advantageously, by being able to accommodate a change in orientation of the displays, and hence accommodate a change in shape of the apparatus, the apparatus is accommodate users of differing sizes of heads and IPDs and provide more comfortable use.

Figure 10:
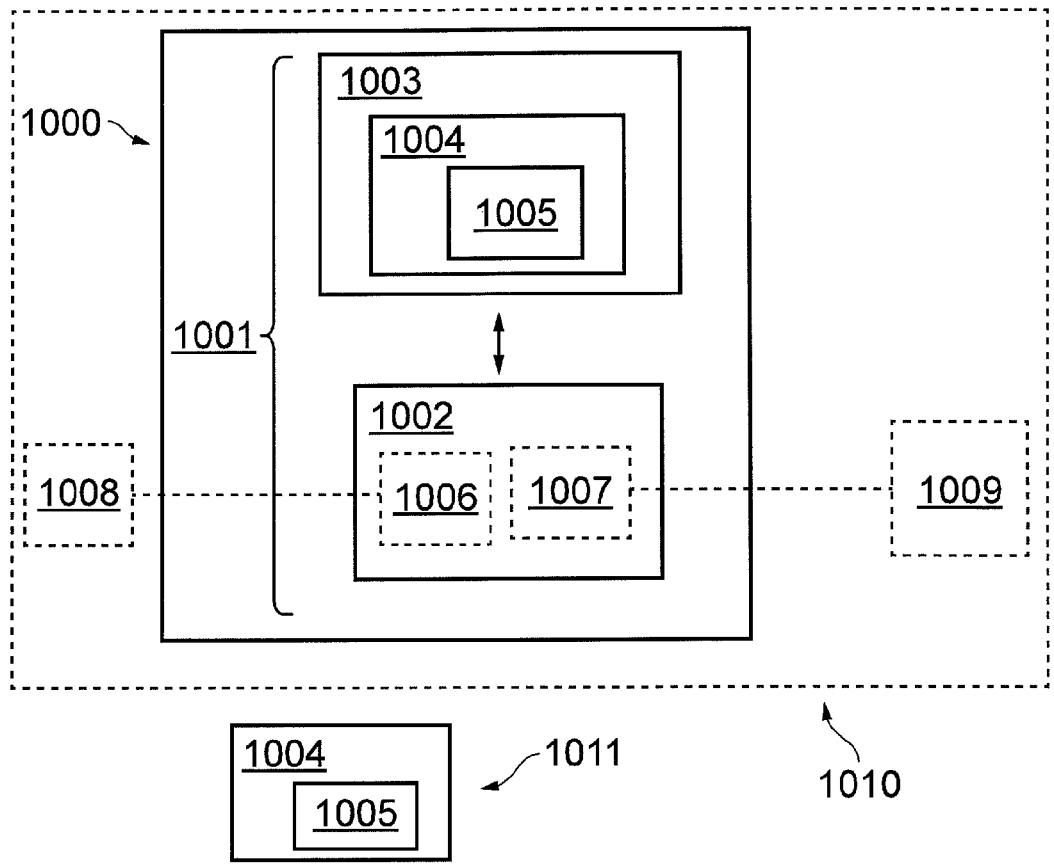
FIG. 10 schematically illustrates a yet further apparatus.

FIG. 10 schematically illustrates a block diagram of an apparatus 1000. FIG. 10 focuses on the functional components necessary for describing the operation of the apparatus. The apparatus comprises a controller 1001. Implementation of the controller 1001 may be as controller circuitry. Implementation of the controller 1001 can be in hardware alone (for example processing circuitry comprising one or more processors and memory circuitry comprising one or more memory elements), have certain aspects in software including firmware alone or can be a combination of hardware and software (including firmware).

The controller may be implemented using instructions that enable hardware functionality, for example, by using executable computer program instructions in a general-purpose or special-purpose processor that may be stored on a computer readable storage medium (disk, memory etc.) or carried by a signal carrier to be performed by such a processor.

In the illustrated example, the apparatus 1000 comprises a controller 1001 which is provided by a processor 1002 and memory 1003. Although a single processor and a single memory are illustrated in other implementations there may be multiple processors and/or there may be multiple memories some or all of which may be integrated/removable and/or may provide permanent/semi-permanent/dynamic/cached storage.

The memory 1003 stores a computer program 1004 comprising computer program instructions 1005 that control the operation of the apparatus when loaded into the processor 1002. The computer program instructions provide the logic and routines that enable the apparatus to perform the methods presently described.

Figure 11:
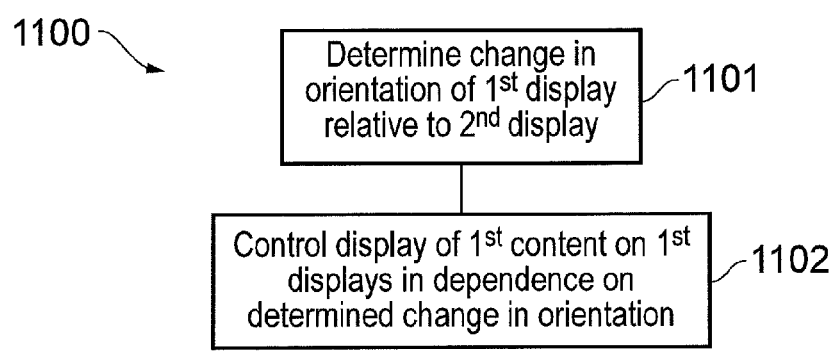
FIG. 11 schematically illustrates a method.
Figure 12:
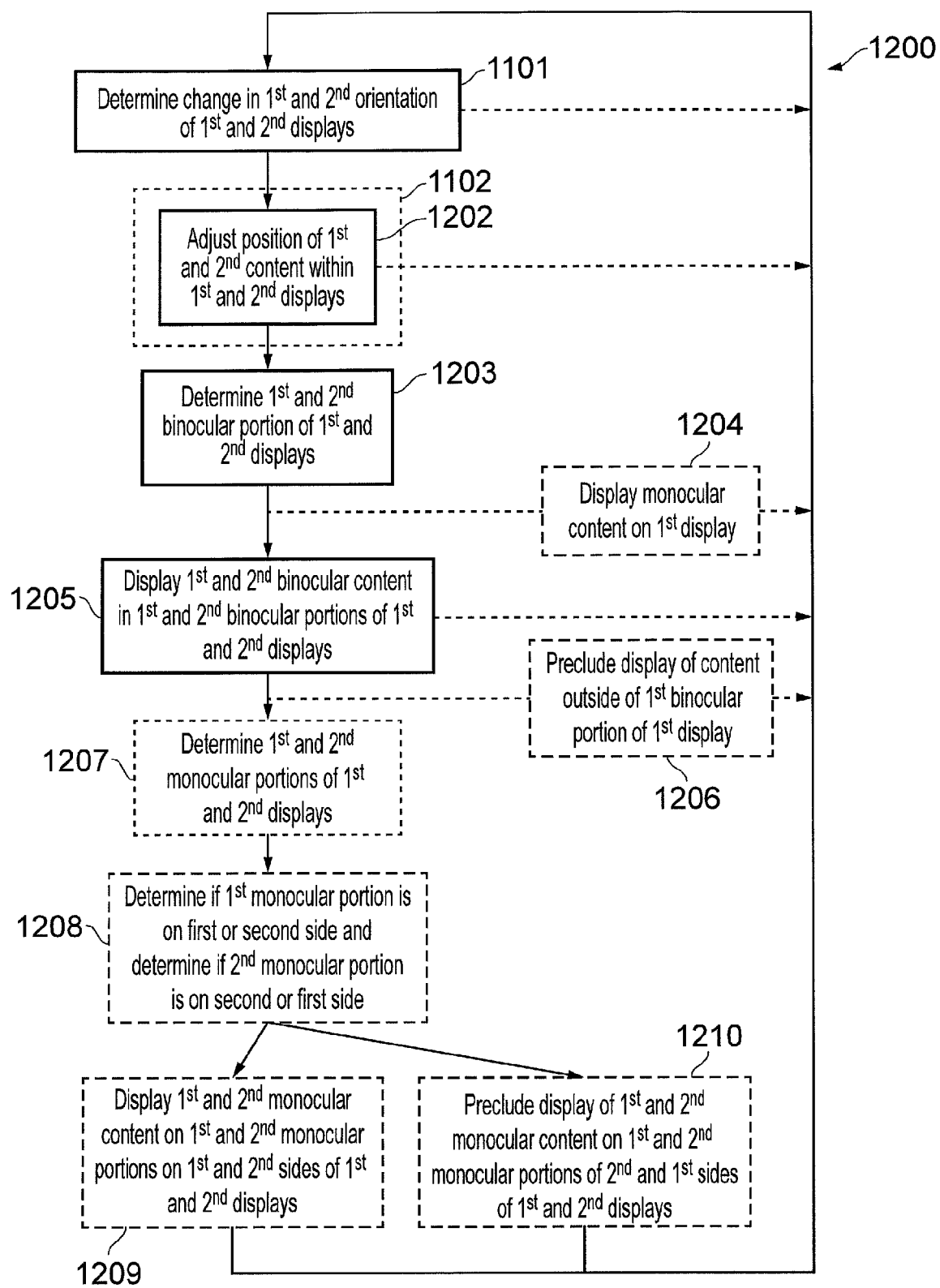
FIG. 12 schematically illustrates a further method.

The at least one memory 1003 and the computer program instructions 1005 are configured to, with the at least one processor 1002, cause the apparatus 1000 at least to perform the method described, for example with respect to FIGS. 11 and 12.

The processor 1002 is configured to read from and write to the memory 1003. The processor 1002 may also comprise an input interface 1006 via which data (such as signals from the first and second image capture devices and motion sensors 1008) and/or commands are input to the processor 1002, and an output interface 1007 via which data and/or commands are output (e.g. to the first and second displays 1009 by the processor 1002.

The computer program may arrive at the apparatus 1000 via any suitable delivery mechanism 1011. The delivery mechanism 1011 may be, for example, a non-transitory computer-readable storage medium, a computer program product, a memory device, a record medium such as a compact disc read-only memory, or digital versatile disc, or an article of manufacture that tangibly embodies the computer program 1004. The delivery mechanism may be a signal configured to reliably transfer the computer program 1004.

The apparatus 1000 may receive, propagate or transmit the computer program 1004 as a computer data signal.

The apparatus 1000 may, for example, be embodied in a binocular near eye display device, not least such as those mentioned above. However, in some examples, the apparatus may be embodied as a chip, chip set or module, i.e. for use in any of the foregoing. As used here 'module' refers to a unit or apparatus that excludes certain parts/components that would be added by an end manufacturer or a user.

Although examples of the apparatus have been described above in terms of comprising various components, it should be understood that the components may be embodied as or otherwise controlled by a corresponding controller or circuitry such as one or more processing elements or processors of the apparatus. In this regard, each of the components described above may be one or more of any device, means or circuitry embodied in hardware, software or a combination of hardware and software that is configured to perform the corresponding functions of the respective components as described above.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry"

would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In one example, the apparatus is embodied on a near eye display device that may additionally provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. Moving Picture Experts Group-1 Audio Layer 3 (MP3) or other format and/or (frequency modulation/amplitude modulation) radio broadcast recording/playing), downloading/sending of data functions, image capture function (e.g. using a (e.g. in-built) digital camera), and gaming functions.

FIG. 11 schematically illustrates a flow chart of a method 1100 according to an example of the present disclosure. In block 1101, a change in the first and second orientations of the first and second display is determined. Such a determination may be via the first/second motion sensor and/or the first/second externally facing image capture devices configured to capture first/second images of the user's real world scene as previously discussed above. In block 1102, the display of first and second content on the first and second display respectively is controlled in dependence on determined change in first and second orientation.

In certain examples of the method, a display mode may be selected. The various display modes include modes displaying:

1) Full binocular content—exclusive binocular content, e.g. FIGS. 3 and 4
2) Partial binocular content and optional partial monocular content—non-exclusive binocular content, e.g. FIG. 5
3) Partial binocular content and no monocular content—exclusive binocular content, e.g. FIG. 6
4) Full single monocular content—exclusive monocular content, e.g. FIG. 7
5) Full dual monocular content—exclusive monocular content, e.g. FIG. 8.

The selection of such modes may be performed automatically in dependence on the presence of and/or size/extent (i.e. with respect to a threshold/reference value) of one or more of:
  determined orientation of the first and second displays,
  determined first and second display coverage regions in the user's field of view,
  determined region of overlap of the first and second display coverage regions, i.e. binocular region, in the user's field of view,
  determined region of no overlap of the first and second display coverage regions, i.e. first and second monocular regions, in the user's field of view,
  determined first and second binocular portions of the first and second displays, and
  determined first and second monocular portions of the first and second displays.

The display mode 1 may be selected where the first and second display coverage regions are determined to substantially coincide/overlap such that the binocular region is substantially maximal in extent.

The display mode 2 may be selected where the first and second display coverage regions are determined to only partially overlap such that there are first and second monocular regions in addition to the binocular region, and wherein the first and second monocular regions are on respective first and second sides of the binocular region (i.e. there is no "over crossing" of the first and second display coverage regions)

The display mode 3 may be selected where the first and second display coverage regions are determined to partially overlap such that there are first and second monocular regions in addition to the binocular region, and wherein the first and second monocular regions are on opposing second and first sides of the binocular region (i.e. there is "over crossing" of the first and second display coverage regions)

The display mode 4 may be selected where the first and second display coverage regions are determined not to overlap at all and or where the device is in a low power mode (where it is desirous to reduce energy consumption and operate only a single display).

The display mode 5 may be selected where the first and second display coverage regions are determined not to overlap at all.

The selection between different modes may alternatively be based on one or more of: gaze tracking data, dominant eye information or manual selection by a user, e.g. via user selection in a user interface.

FIG. 12 schematically illustrates a flow chart of a further method 1200 according to an example of the present disclosure.

In block 1101, a change in the first and second orientations of the first and second display is determined. If no change is determined the process may loop back to block 1101 so as to continuously monitor for changes such that the overall alignment and display process 1200 may be continuously performed.

In block 1202, the position of first and second content within first and second displays is adjusted in dependence on determined change in first and second orientation. Following block 1202, the process may revert back to block 1101 such that the overall alignment and display process 1200 may be continuously performed.

In block 1203, the first and second binocular portions of the first and second displays are determined. If it is determined that there are no first and second binocular portions of the first and second displays, i.e. if it is determined that there is no overlap of the first and second display coverage regions, and hence no binocular region, in the user's field of view, then in block 1204, monocular content is displayed on the first and second displays. Monocular content is content displayed only by one of the first and second displays (c.f. binocular content which is displayed by both the first and second displays). The monocular content may comprise real world tracked/fixed augmented content or display fixed content such as a graphical user interface. Following block 1204, the process may revert back to block 1101 such that the overall alignment and display process 1200 may be continuously performed.

If it is determined that there are first and second binocular portions of the first and second displays, i.e. if it is determined that there is an overlap of the first and second display coverage regions, and hence there is a binocular region, in the user's field of view, then in block 1205, binocular content is displayed in the first and second binocular portions of the first and second displays. The binocular content may comprise real world tracked/fixed augmented content simultaneously displayed by both the first and second displays. Following block 1204, the process may revert back to block 1101 such that the overall alignment and display process 1200 may be continuously performed.

Following block 1205, optionally, in block 1206 content outside of the first and second binocular portions of the first and second displays is prevented from being displayed. Following block 1206, the process may revert back to block 1101 such that the alignment and display process may be continuously performed.

Alternatively, following block 1205, in block 1207, first and second monocular portions of the first and second displays are determined.

In block 1208, a determination is made as to whether the first monocular portion is on the first or second side and a determination is made as to whether the second monocular portion of the second display is on the second or first side.

If, the first and second monocular portions are respectively on the first and second sides, then in block 1209, first and second monocular content is displayed on the first and second monocular portions of the first and second displays. Following block 1209, the process may revert back to block 1101 such that the alignment and display process may be continuously performed.

If, the first and second monocular portions are respectively on the second and first sides, then in block 1210, first and second monocular content is precluded from being displayed on the first and second monocular portions of the first and second displays. Following block 1210, the process may revert back to block 1101 such that the alignment and display process may be continuously performed.

The flowchart of FIG. 12 represents one possible scenario among others. The order of the blocks shown is not absolutely required, so in principle, the various blocks can be performed out of order. Not all the blocks are essential.

The component blocks of FIGS. 11 and 12 are functional and the functions described may or may not be performed by a single physical entity (such as is described with reference not least to apparatus 100-600 and 1000).

According to one or more examples of the disclosure there is provided an apparatus comprising a controller 104 configured to:
  determine a first change in orientation 108₁' of a first display 101₁ for a user's first eye 102₁;
  determine a second change in orientation 108₂' of a second display 101₂ for a user's second eye 102₂;
  control the display of first content 309₁ on the first display in dependence on the determined first change in orientation; and
  control the display of second content 309₂ on the second display in dependence on the determined second change in orientation.

The first change in orientation may be different from the second change in orientation and consequently, the control of the display of first content on the first display may be different to the control of the display of second content on the second display. For example, the first display's orientation may change by a 5° counter clockwise rotation whilst the second display's orientation may not change. Hence, the display of the first content may be moved to the right by an amount proportional to the determined extent of change of orientation (with respect to a reference orientation) whilst the display of second content is not moved.

In some examples, means other than a motion sensor and an image capture device may be used to determine the orientation of a display. Other technologies may be used to determine and track orientation, not least for example: radar, magnetic, radio, Wi-Fi, or laser scanning based technologies.

Examples of the present disclosure may take the form of a method, an apparatus or a computer program. Accordingly, examples may be implemented in hardware, software or a combination of hardware and software.

Examples of the present disclosure are described using flowchart illustrations and schematic block diagrams. It will be understood that each block (of the flowchart illustrations and block diagrams), and combinations of blocks, can be implemented by computer program instructions of a computer program. These program instructions may be provided to one or more processor(s), processing circuitry or controller(s) such that the instructions which execute on the same create means for causing implementing the functions specified in the block or blocks, i.e. such that the method may be computer implemented. The computer program instructions may be executed by the processor(s) to cause a series of operational steps/actions to be performed by the processor(s) to produce a computer implemented process such that the instructions which execute on the processor(s) provide steps for implementing the functions specified in the block or blocks.

Accordingly, the blocks support: combinations of means for performing the specified functions; combinations of actions for performing the specified functions; and computer program instructions/algorithm for performing the specified functions. It will also be understood that each block, and combinations of blocks, can be implemented by special purpose hardware-based systems which perform the specified functions or actions, or combinations of special purpose hardware and computer program instructions.

Examples of the present disclosure provide both a method and corresponding apparatus comprising various modules, means or circuitry that provide the functionality for performing/applying the actions of the method. The modules, means or circuitry may be implemented as hardware, or may be implemented as software or firmware to be performed by a computer processor. In the case of firmware or software, examples of the present disclosure can be provided as a computer program product including a computer readable storage structure embodying computer program instructions (i.e. the software or firmware) thereon for performing by the computer processor.

The apparatus may be provided in an electronic device, for example, mobile terminal, according to an exemplary embodiment of the present disclosure. It should be understood, however, that a mobile terminal is merely illustrative of an electronic device that would benefit from examples of implementations of the present disclosure and, therefore, should not be taken to limit the scope of the present disclosure to the same. While certain in certain implementation examples the apparatus may be provided in a head mountable display, other types of electronic devices, such as, but not limited to, a mobile terminal, hand portable electronic devices, wearable computing devices, portable digital assistants (PDAs), mobile computers, televisions, gaming devices, laptop computers, cameras, video recorders, GPS devices and other types of electronic systems, may readily employ examples of the present disclosure.

The blocks illustrated in FIGS. 11 and 12 may represent actions in a method and/or sections of instructions/code in the computer program 1004.

It will be understood that each block and combinations of blocks, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory storage device and performed by a processor.

As will be appreciated, any such computer program instructions may be loaded onto a computer or other programmable apparatus (i.e., hardware) to produce a machine, such that the instructions when performed on the programmable apparatus create means for implementing the functions specified in the blocks. These computer program instructions may also be stored in a computer-readable medium that can direct a programmable apparatus to function in a particular manner, such that the instructions stored in the computer-readable memory produce an article of manufacture including instruction means which implement the function specified in the blocks. The computer program instructions may also be loaded onto a programmable apparatus to cause a series of operational actions to be performed on the programmable apparatus to produce a computer-implemented process such that the instructions which are performed on the programmable apparatus provide actions for implementing the functions specified in the blocks.

Although specific terms are employed herein, they are used in a generic and descriptive sense only and not for purposes of limitation.

Features described in the preceding description may be used in combinations other than the combinations explicitly described.

Although functions have been described with reference to certain features, those functions may be performable by other features whether described or not.

Although features have been described with reference to certain examples, those features may also be present in other examples whether described or not.

Accordingly, features described in relation to one example/aspect of the disclosure may include any or all of the features described in relation to another example/aspect of the disclosure, and vice versa, to the extent that they are not mutually inconsistent.

Although various examples of the present disclosure have been described in the preceding paragraphs, it should be appreciated that modifications to the examples given can be made without departing from the scope of the invention as set out in the claims.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components).

As used herein, the "determining" (and grammatical variants thereof) can include, not least: calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

In this description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some or all other examples. Thus 'example', for 'example' or 'may' refers to a particular instance in a class of examples. A property of the instance can be a property of only that instance or a property of the class or a property of a sub-class of the class that includes some but not all of the instances in the class.

In this description, references to "a/an/the" [feature, element, component, means . . . ] are to be interpreted as "at least one" [feature, element, component, means . . . ] unless explicitly stated otherwise.

In the above description, the apparatus described may alternatively or in addition comprise an apparatus which in some other embodiments comprises a distributed system of apparatus, for example, a client/server apparatus system. In examples of embodiments where an apparatus provided forms (or a method is implemented as) a distributed system, each apparatus forming a component and/or part of the system provides (or implements) one or more features which collectively implement an example of the present disclosure. In some examples of embodiments, an apparatus is re-configured by an entity other than its initial manufacturer to implement an example of the present disclosure by being provided with additional software, for example by a user downloading such software, which when executed causes the apparatus to implement an example of the present disclosure (such implementation being either entirely by the apparatus or as part of a system of apparatus as mentioned hereinabove).

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavouring in the foregoing specification to draw attention to those features of examples of the present disclosure believed to be of particular importance it should be understood that the applicant claims protection in respect of any patentable feature or combination of features hereinbefore referred to and/or shown in the drawings whether or not particular emphasis has been placed thereon.

The examples of the present disclosure and the accompanying claims may be suitably combined in any manner apparent to one of ordinary skill in the art.

Each and every claim is incorporated as further aspects of the disclosure of the present specification and the claims are embodiment(s) of the present invention. Further, while the claims herein are provided as comprising specific dependencies, it is contemplated that any claims may depend from any other claims and that to the extent that any alternative embodiments may result from combining, integrating, and/ or omitting features of the various claims and/or changing dependencies of claims, any such alternative embodiments and their equivalents are also within the scope of the disclosure.

I claim:

1. An apparatus comprising:
   a first display for a user's first eye;
   a first motion sensor and/or a first externally facing image capture device configured to capture at least a first image of a user's real world point of view;
   a second display for a user's second eye;
   a second motion sensor and/or a second externally facing image capture device configured to capture at least a second image of a user's real world scene; and
   a controller configured to:
      receive at least a first signal from: the first motion sensor and/or the first image capture device,
      receive at least a second signal from: the second motion sensor and/or the second image capture device,
      determine, based on the received at least first and second signals, a change in orientation of the first display with respect to the second display, and
      control display of first content on the first display in dependence on the determined change in orientation.

2. The apparatus of claim 1, wherein controlling the display of the first content comprises adjusting a first position within the first display at which the first content is displayed.

3. The apparatus of claim 1, wherein the controller is configured to:
   determine, with respect to a frame of reference of the user's field of view, a first display coverage region within the user's field of view, the first display coverage region corresponding to a region of the user's field of view occupied by the first display; and
   determine, with respect to the frame of reference of the user's field of view, a second display coverage region within the user's field of view, the second display coverage region corresponding to a region of the user's field of view occupied by the second display.

4. The apparatus of claim 3, wherein the controller is configured to:
   determine, with respect to a frame of reference of the user's field of view, a binocular region within the user's field of view, the binocular region corresponding to a region of overlap of the first and second display coverage regions.

5. The apparatus of claim 4, wherein the controller is configured to:
   determine, with respect to a frame of reference of the first display, a first binocular portion of the first display, the first binocular portion corresponding to a portion of the first display where content displayed therein is perceived in the binocular region of the user's field of view; and
   determine, with respect to a frame of reference of the second display, a second binocular portion of the second display, the second binocular portion corresponding to a portion of the second display where content displayed therein is perceived in the binocular region of the user's field of view.

6. The apparatus of claim 3, wherein the controller is configured to:
   determine, with respect to the frame of reference of the user's field of view, a first monocular region, the first monocular region corresponding to a region within the first display coverage region where the first and second display coverage regions do not overlap; and
   determine, with respect to the frame of reference of the user's field of view, a second monocular region, the second monocular region corresponding to a region within the second display coverage region where the first and second display coverage regions do not overlap.

7. The apparatus of claim 6, wherein the controller is configured to:
   determine, with respect to the frame of reference of the first display, a first monocular portion of the first display, the first monocular portion corresponding to a portion of the first display where content displayed therein is perceived in the first monocular region of the user's field of view; and
   determine, with respect to the frame of reference of the second display, a second monocular portion of the second display, the second monocular portion corresponding to a portion of the second display where content displayed therein is perceived in the second monocular region of the user's field of view.

8. A method comprising:
   receiving at least a first signal from: a first motion sensor and/or a first externally facing image capture device configured to capture at least a first image of a user's real world point of view;
   receiving at least a second signal from: a second motion sensor and/or a second externally facing image capture device configured to capture at least a second image of a user's real world scene;
   determining, based on the received at least first and second signals, a change in orientation of a first display for a user's first eye with respect to a second display for a user's first eye; and
   controlling display of first content on the first display in dependence on the determined change in orientation.

9. The method of claim 8, wherein controlling the display of the first content comprises adjusting a first position within the first display at which the first content is displayed.

10. The method of claim 8, further comprising:
    determining, with respect to a frame of reference of the user's field of view, a first display coverage region within the user's field of view, the first display coverage region corresponding to a region of the user's field of view occupied by the first display; and
    determining, with respect to the frame of reference of the user's field of view, a second display coverage region within the user's field of view, the second display coverage region corresponding to a region of the user's field of view occupied by the second display.

11. The method of claim 10, further comprising:
    determining, with respect to a frame of reference of the user's field of view, a binocular region within the user's field of view, the binocular region corresponding to a region of overlap of the first and second display coverage regions.

12. The method of claim 11, further comprising:
    determining, with respect to a frame of reference of the first display, a first binocular portion of the first display, the first binocular portion corresponding to a portion of the first display where content displayed therein is perceived in the binocular region of the user's field of view; and
    determining, with respect to a frame of reference of the second display, a second binocular portion of the second display, the second binocular portion corresponding to a portion of the second display where content displayed therein is perceived in the binocular region of the user's field of view.

13. The method of claim 11, further comprising:
displaying content in the determined first and second binocular portions of the first and second displays.

14. The method of claim 10, further comprising:
precluding display of content outside of the determined first and second binocular portions of the first and second displays.

15. The method of claim 10, further comprising:
determining, with respect to the frame of reference of the user's field of view, a first monocular region, the first monocular region corresponding to a region within the first display coverage region where the first and second display coverage regions do not overlap; and
determining, with respect to the frame of reference of the user's field of view, a second monocular region, the second monocular region corresponding to a region within the second display coverage region where the first and second display coverage regions do not overlap.

16. The method of claim 15, further comprising:
determining, with respect to the frame of reference of the first display, a first monocular portion of the first display, the first monocular portion corresponding to a portion of the first display where content displayed therein is perceived in the first monocular region of the user's field of view; and
determining, with respect to the frame of reference of the second display, a second monocular portion of the second display, the second monocular portion corresponding to a portion of the second display where content displayed therein is perceived in the second monocular region of the user's field of view.

17. The method of claim 16, further comprising:
displaying content in the determined first and second binocular portions of the first and second displays; and
displaying content in the determined first and second monocular portions of the first and second displays.

18. The method of claim 8, further comprising:
continuously determining, based on continuously received at least first and second signals, changes in the orientation of the first display and the second display, and
continuously controlling the display of first and second content on the first and second display in dependence on the determined changes in the orientation of the first and second displays.

19. A non-transitory program storage device readable by a machine, tangibly embodying a program of instructions executable by the machine for performing operations, the operations comprising the method as claimed in claim 8.

20. An apparatus comprising:
at least one processor; and
at least one non-transitory memory including computer program code;
the at least one memory and the computer program code configured to, with the at least one processor, cause the apparatus at least to perform:
receiving at least a first signal from: a first motion sensor and/or a first externally facing image capture device configured to capture at least a first image of a user's real world point of view;
receiving at least a second signal from: a second motion sensor and/or a second externally facing image capture device configured to capture at least a second image of a user's real world scene;
determining, based on the received at least first and second signals, a change in orientation of a first display for a user's first eye with respect to a second display for a user's first eye; and
controlling display of first content on the first display in dependence on the determined change in orientation.

* * * * *